United States Patent
Chien

(10) Patent No.: US 10,065,390 B2
(45) Date of Patent: Sep. 4, 2018

(54) INSULATED FIBERFILL

(71) Applicant: SHINIH ENTERPRISE CO., LTD., Taoyuan (TW)

(72) Inventor: Jung-Fu Chien, Taoyuan (TW)

(73) Assignee: SHINIH ENTERPRISE CO., LTD., Taoyuan (TW)

( * ) Notice: Subject to any disclaimer, the term of this patent is extended or adjusted under 35 U.S.C. 154(b) by 351 days.

(21) Appl. No.: 14/952,901

(22) Filed: Nov. 25, 2015

(65) Prior Publication Data

US 2016/0297168 A1    Oct. 13, 2016

(30) Foreign Application Priority Data

Apr. 13, 2015    (CN) .......................... 2015 1 0171330

(51) Int. Cl.
| | |
|---|---|
| *B32B 5/06* | (2006.01) |
| *B32B 3/28* | (2006.01) |
| *B32B 5/26* | (2006.01) |
| *B32B 7/04* | (2006.01) |
| *A47G 9/00* | (2006.01) |

(Continued)

(52) U.S. Cl.
CPC ................. *B32B 3/28* (2013.01); *A47G 9/00* (2013.01); *B32B 3/263* (2013.01); *B32B 5/06* (2013.01); *B32B 5/26* (2013.01); *B32B 7/045* (2013.01); *A41D 31/0038* (2013.01); *B32B 2250/02* (2013.01); *B32B 2250/03* (2013.01); *B32B 2250/20* (2013.01); *B32B 2307/304* (2013.01)

(58) Field of Classification Search
CPC ...... D05B 35/08; D05B 35/085; D05B 11/00; D05B 11/005; B32B 3/28; B32B 5/26; B32B 5/06
See application file for complete search history.

(56) References Cited

U.S. PATENT DOCUMENTS

| | | | |
|---|---|---|---|
| 2,689,811 A * | 9/1954 | Frederick ................. | D04H 1/74 264/119 |
| 4,576,853 A * | 3/1986 | Vaughn ..................... | B32B 5/26 428/181 |
| 5,008,141 A | 4/1991 | Shinozuka | |

(Continued)

FOREIGN PATENT DOCUMENTS

| | | |
|---|---|---|
| JP | H01-299507 A | 12/1989 |
| KR | 10-2012-0021395 A | 3/2012 |
| TW | 201122168 A1 | 7/2011 |

*Primary Examiner* — Danny Worrell
(74) *Attorney, Agent, or Firm* — Pai Patent & Trademark Law Firm; Chao-Chang David Pai

(57) ABSTRACT

An insulated fiberfill comprises a first fiber layer and a second fiber layer. The first fiber layer comprises an inner surface and multiple connecting portions arranged on the inner surface and spaced from each other. The second fiber layer is mounted on the inner surface, and comprises multiple joining portions respectively connected with the connecting portions and multiple folding portions inclined toward a same direction. Each of the folding portions is formed between two adjacent joining portions, leans against an adjacent folding portion, and covers at least one of the joining portions. Accordingly, the insulated fiberfill is beneficial for enhancing the capability of the coat and sleeping bag to keep the human body warm. Also, the fabricating steps of the coat and sleeping bag are simplified, and the fabricating time of the same is shortened.

12 Claims, 8 Drawing Sheets

(51) Int. Cl.
*B32B 3/26* (2006.01)
*A41D 31/00* (2006.01)

(56) References Cited

U.S. PATENT DOCUMENTS

| | | | |
|---|---|---|---|
| 5,150,476 A * | 9/1992 | Statham | A41D 31/0027 2/272 |
| 5,558,924 A | 9/1996 | Chien et al. | |
| 5,639,700 A * | 6/1997 | Braun | A62B 23/02 442/340 |
| 5,702,801 A | 12/1997 | Chien | |
| 5,830,311 A * | 11/1998 | Braun | A62B 23/02 156/471 |
| 6,602,581 B2 * | 8/2003 | Aneja | A47G 9/10 156/205 |
| 2003/0118785 A1 * | 6/2003 | Aneja | A47G 9/10 428/182 |
| 2008/0057263 A1 * | 3/2008 | Chien | B01D 29/012 428/98 |

* cited by examiner

INSULATED FIBERFILL

CROSS-REFERENCE TO RELATED APPLICATION(S)

This application is based upon and claims priority under 35 U.S.C. 119(a) from China Patent Application No. 201510171330.1 filed on Apr. 13, 2015, which is hereby specifically incorporated herein by this reference thereto.

BACKGROUND OF THE INVENTION

1. Field of the Invention

The present invention relates to a filler; especially relates to an insulated fiberfill.

2. Description of the Prior Art(s)

Textiles, such as sleeping bags or coats, are used at cold weather to keep human body warm without hypothermia.

A sleeping bag 70 shown in FIG. 7 is fabricated as follows. Two outer fabric layers 71 are overlapped to each other and sewed together via multiple stitch portions 72 to form multiple filling rooms. The stitch portions 72 are sewed by machinery on the outer fabric layer 71 at spaced intervals. Each of the filling rooms is defined by the outer fabric layers 71 and two adjacent stitch portions 72. Fibers, such as cotton 73, are stuffed into each of the filling rooms to complete fabrication of the sleeping bag 70. Although the sleeping bag 70 keeps the human body warm by the fabrics stuffed in the filling rooms, the fibers are not allowed stuffing in the filling rooms until the stitch portions 72 are sewed. Therefore, the fabrication of the sleeping bag 70 is complicated, and requires quite a lot of time and manpower.

Regarding the complicated and highly time-consuming fabrication of the sleeping bag 70, a thermal insulation piece 80 shown in FIG. 8 is provided. The thermal insulation piece 80 is fabricated as follows. A fiber layer 82 is laid between two surface fabric layers 81. The fiber layer 82 and the surface fabric layers 81 are partially melted by high frequency heating to form multiple junctions 83 at spaced intervals, so as to obtain the thermal insulation piece 80. The thermal insulation piece 80 is made as a textile, such as the sleeping bag 70 shown in FIG. 7, after proper tailoring and sewing, instead of forming the filling rooms firstly and stuffing the fibers in sequence. Therefore, the process for fabricating the sleeping bag 70 is simplified and the time for the same is shortened.

In textile industry, a site where a textile is unable to effectively block the penetration of cold air is named as a cold spot of the textile. The machinery sewed stitch portions 72 of the sleeping bag 70 has slits formed through the outer fabric layers 71, so cold air is allowed to penetrate into the sleeping bag 70 via the slits. In addition, the junctions 83 of the thermal insulation piece 80 are thin, so the junctions 83 are unable to effectively block the penetration of the cold air to decrease heat loss. Accordingly, the stitch portions 72 of the sleeping bag 70 and the junctions 83 of the thermal insulation piece 80 are the so-called cold spots in textile industry. The stitch portions 72 and the junctions 83 are ineffective in blocking the cold air. Therefore, the sleeping bag 70 and the thermal insulation piece 80 are insufficient for keeping the human body warm.

To overcome the shortcomings, the present invention provides an insulated fiberfill to mitigate or obviate the aforementioned problems.

SUMMARY OF THE INVENTION

The objective of the present invention is to provide an insulated fiberfill which blocks the cold air and decreases heat dissipation effectively, so as to keep the human body warm.

The insulated fiberfill in accordance with the present invention comprises a first fiber layer and a second fiber layer. The first fiber layer comprises an inner surface and multiple connecting portions arranged on the inner surface. The connecting portions are spaced from each other. The second fiber layer is mounted on the inner surface, and comprises multiple joining portions respectively connected with the connecting portions and multiple folding portions inclined toward a same direction. Each of the folding portions is formed between two adjacent joining portions, leans against an adjacent folding portion, and covers at least one of the joining portions.

Preferably, the second fiber layer comprises multiple air spaces; each of the air spaces is defined by the inner surface and each of the folding portions.

Preferably, each of the folding portions covers one of the joining portions.

Preferably, each of the folding portions covers at least two of the joining portions. More preferably, each of the folding portions covers two of the joining portions.

Preferably, a distance between two adjacent joining portions is larger than a distance between two adjacent connecting portions.

Preferably, the first fiber layer is made of a synthetic fiber, a natural fiber, or a combination thereof. More preferably, the first fiber layer is a staple fiber layer.

Preferably, the second fiber layer is a staple fiber layer consisted of a natural staple fiber, a synthetic staple fiber, or a combination thereof.

Further, the natural staple fiber is a plant fiber or a mineral fiber.

Preferably, the joining portions are respectively sewed with the connecting portions.

While the insulated fiberfill is applied to a warm textile, such as a coat or a sleeping bag, cold air at the outside of the warm textile and the heat between the human body and the inside of the warm textile are blocked by the insulated fiberfill, and thereby the cold air and the heat can hardly be transmitted inward and outward respectively. Therefore, the capability of the warm textile to keep the human body warm is enhanced. In addition, the insulated fiberfill is served as the inner layer of the warm textile directly, so the fabricating process of the warm textile is simplified and the fabricating time of the same is shortened.

Accordingly, the insulated fiberfill is beneficial for enhancing the capability of the warm textile to keep the human body warm, and simplifying the fabricating process and shortening the fabricating time of the warm textile.

Other objectives, advantages, and novel features of the invention will become more apparent from the following detailed description when taken in conjunction with the accompanying drawings.

DETAILED DESCRIPTION OF THE PREFERRED EMBODIMENTS

Figure 1:
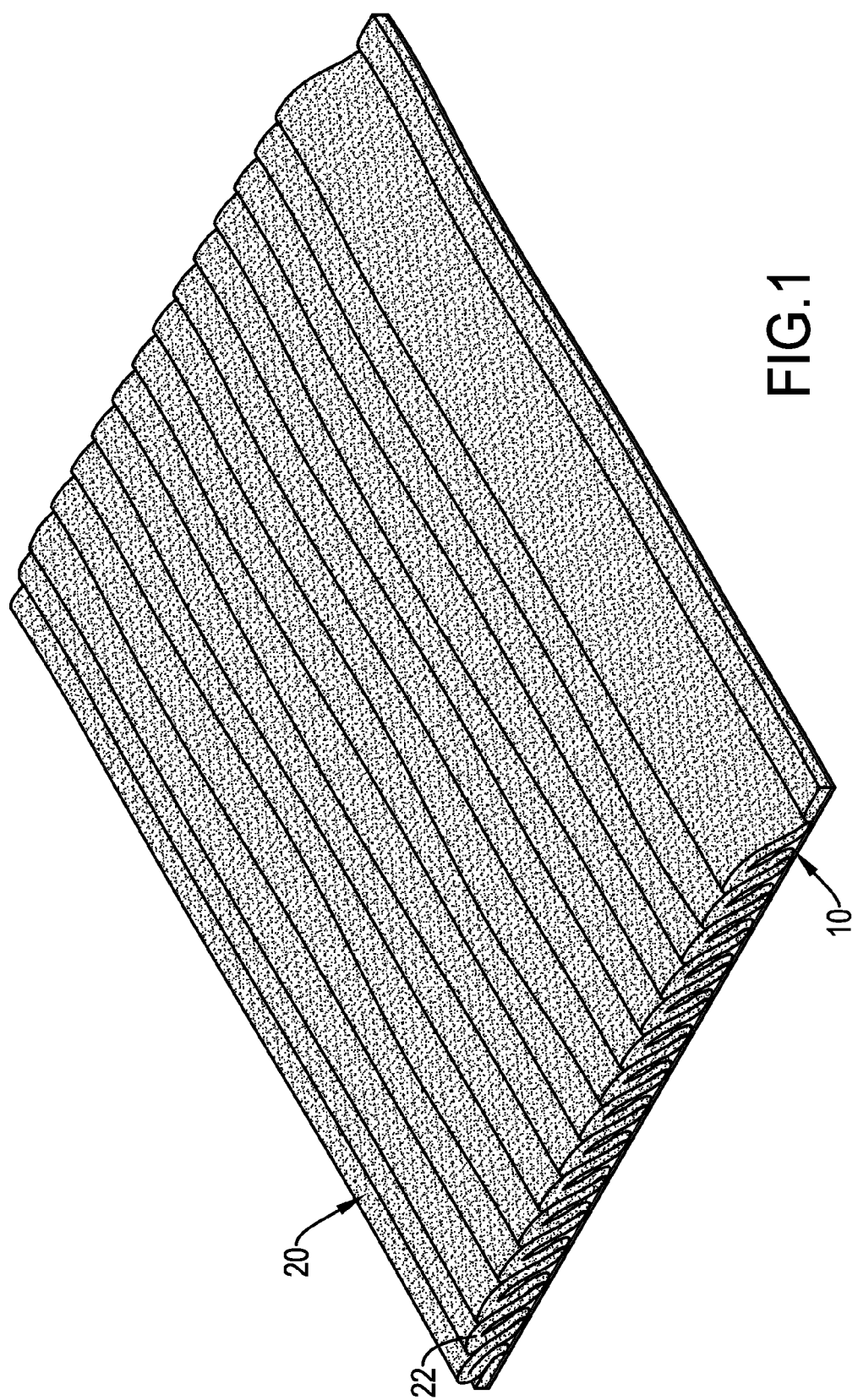
FIG. 1 is a perspective view of an embodiment of an insulated fiberfill in accordance with the present invention.

With reference to FIG. 1, an insulated fiberfill in accordance with the present invention comprises a first fiber layer 10 and a second fiber layer 20.

Figure 2:
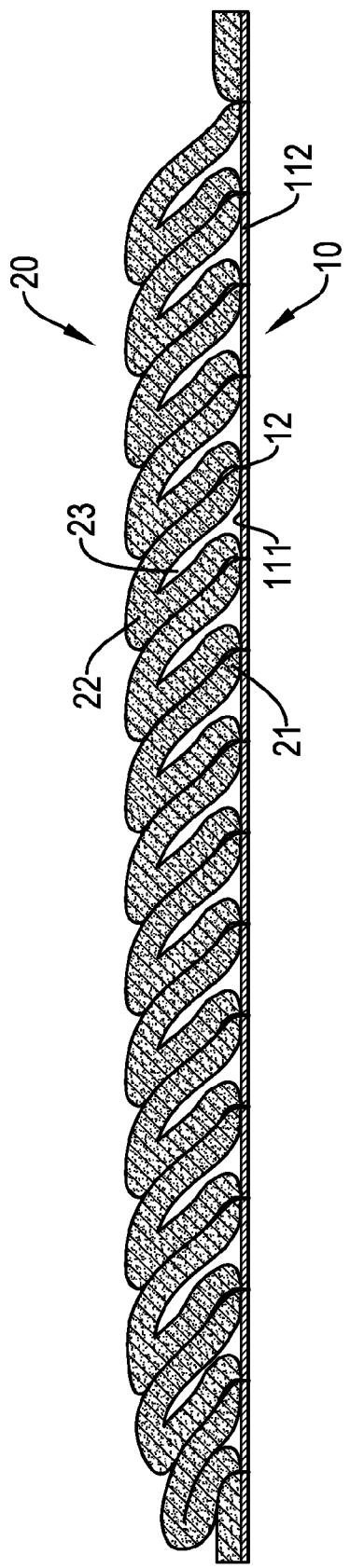
FIG. 2 is a cross sectional side view of the insulated fiberfill in FIG. 1.

With reference to FIGS. 1 and 2, the first fiber layer 10 comprises an inner surface 111, an outer surface 112 opposite the inner surface 111, and multiple connecting portions 12 arranged on the inner surface 111. The connecting portions 12 are spaced from each other.

With reference to FIGS. 1 and 2, the second fiber layer 20 is mounted on the inner surface 111. The second fiber layer 20 comprises multiple joining portions 21, multiple folding portions 22, and multiple air spaces 23. The joining portions 21 are respectively connected with the connecting portions 12, and the distance along the second fiber layer 20 between two adjacent joining portions 21 is larger than the distance along the first fiber layer 10 between two adjacent connecting portions 12, so each of the folding portions 22 is formed between two adjacent joining portions 21. The folding portions 22 are inclined toward a same direction. Each of the folding portions 22 leans against an adjacent folding portion 22. Each of the folding portions 22 covers at least one of the joining portions 21. Each of the air spaces 23 is defined by each of the folding portions 22 and the inner surface 111.

Figure 3:
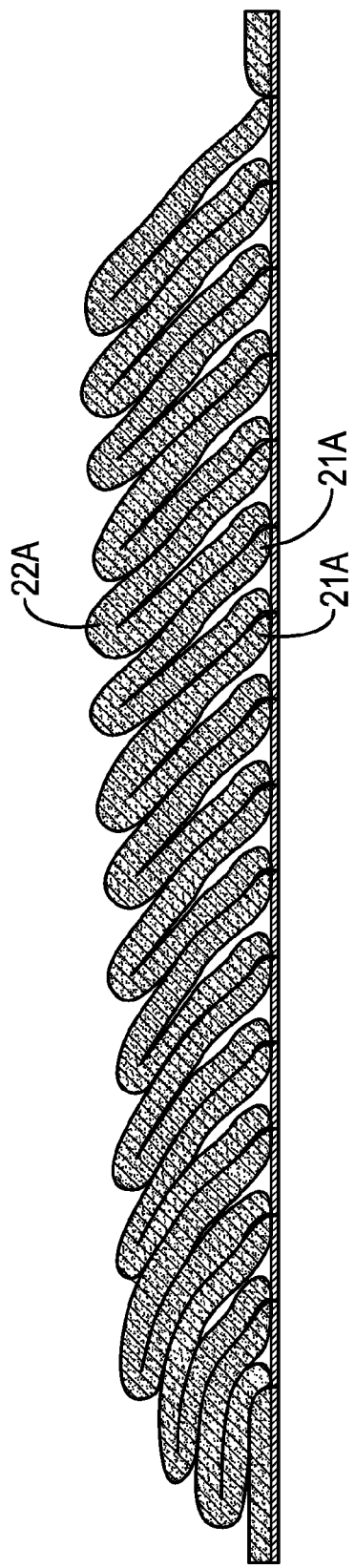
FIG. 3 is a perspective view of another embodiment of an insulated fiberfill in accordance with the present invention.

With reference to FIG. 2, in an embodiment, each of the folding portions 22 covers one of the joining portions 21. The joining portions 21 are respectively sewed with the connecting portions 12. The second fiber 20 is a staple fiber layer made of a natural fiber. The first fiber layer 10 is made of a synthetic fiber. With reference to FIG. 3, in an embodiment, each of the folding portions 22A covers more than one of the joining portions 21A. Further, each of the folding portions 22A covers two of the joining portions 21A. In an embodiment, the first fiber layer 10 is a staple fiber layer made of a natural fiber.

Figure 4:
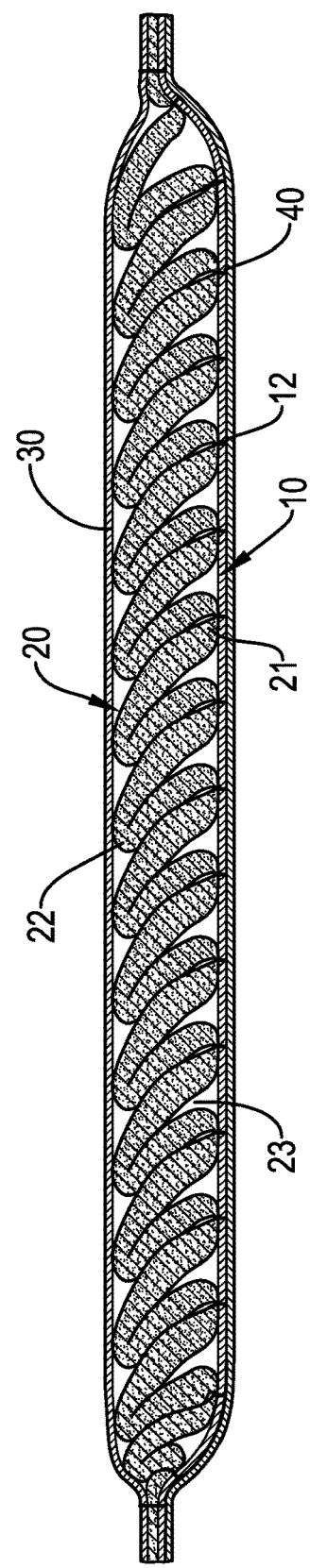
FIG. 4 is a schematic operational view of the insulated fiberfill in FIG. 1.
Figure 5:
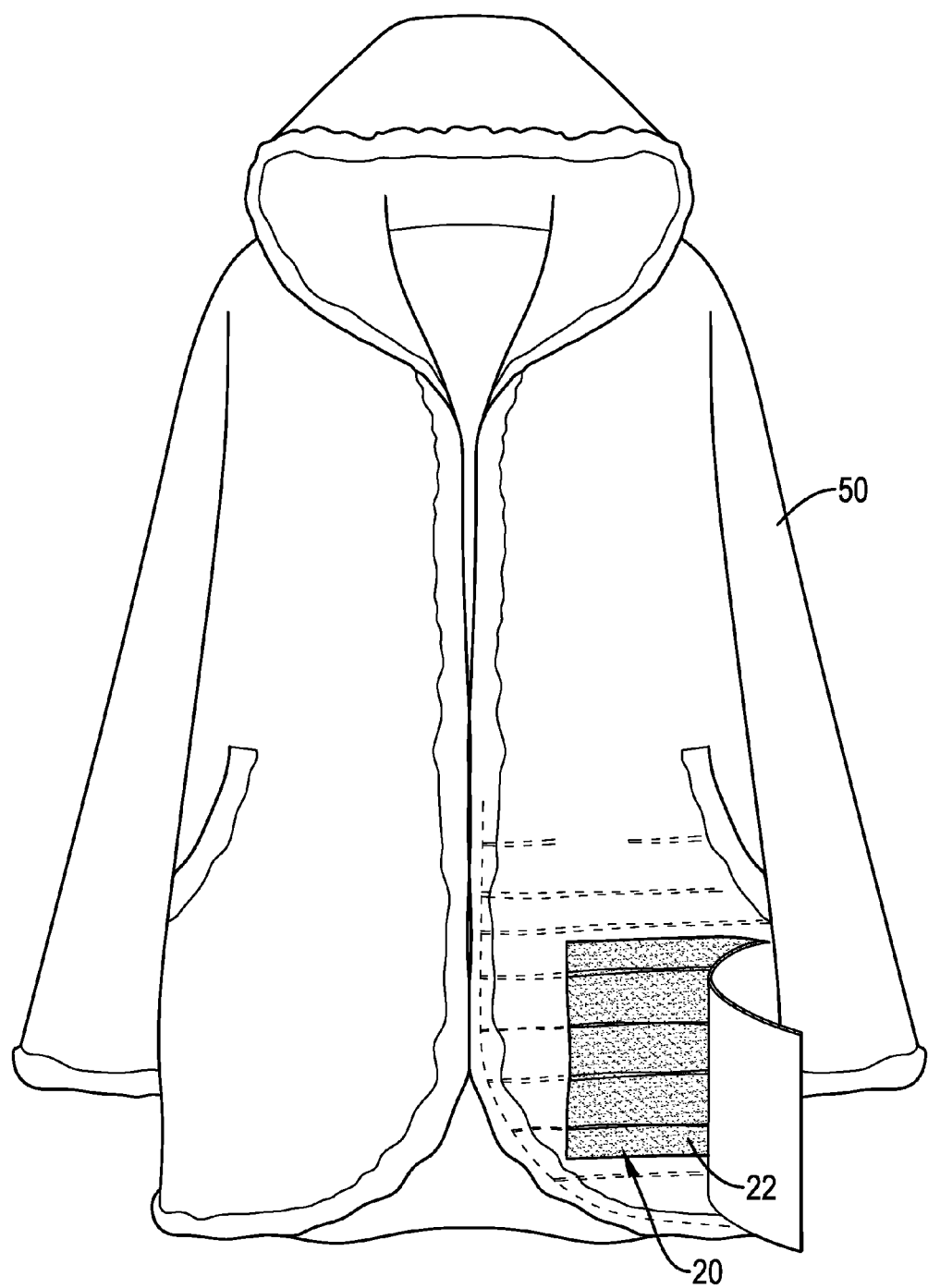
FIG. 5 is a schematic plane view of a warm textile (a coat) made of the insulated fiberfill in FIG. 1.
Figure 6:
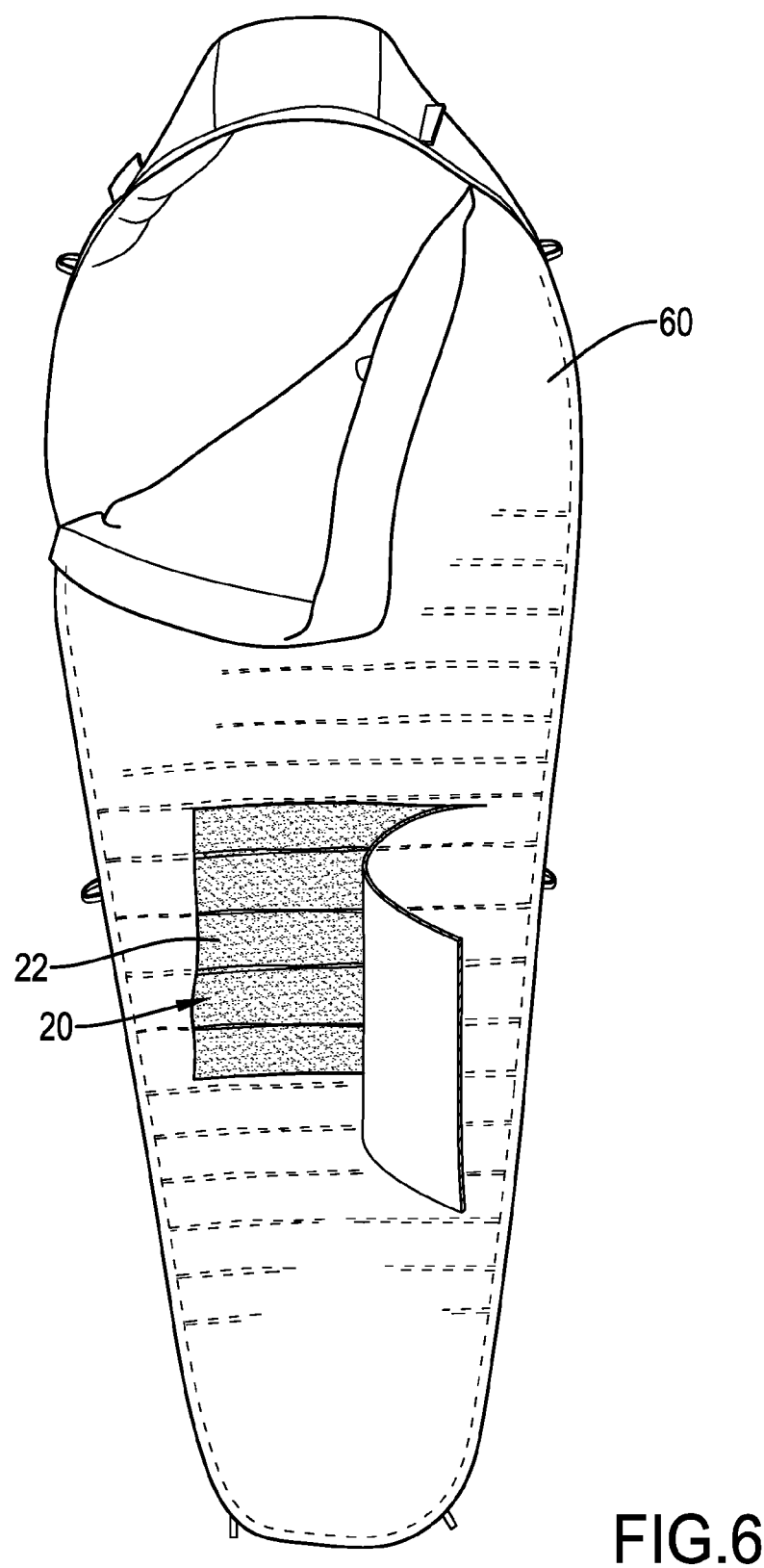
FIG. 6 is a schematic plane view of a warm textile (a sleeping bag) made of the insulated fiberfill in FIG. 1.
Figure 7:
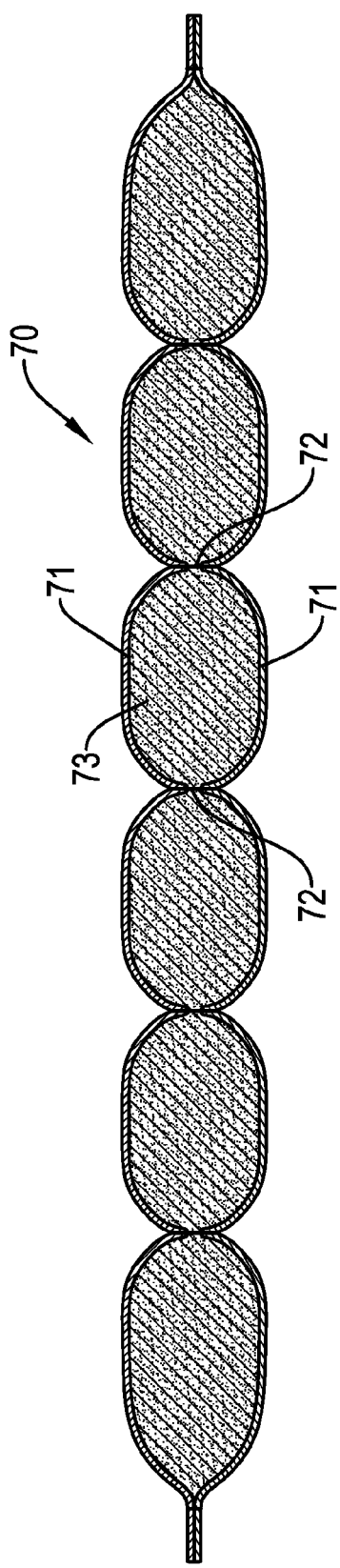
FIG. 7 is a cross sectional side view of a sleeping bag in accordance with the prior art.
Figure 8:
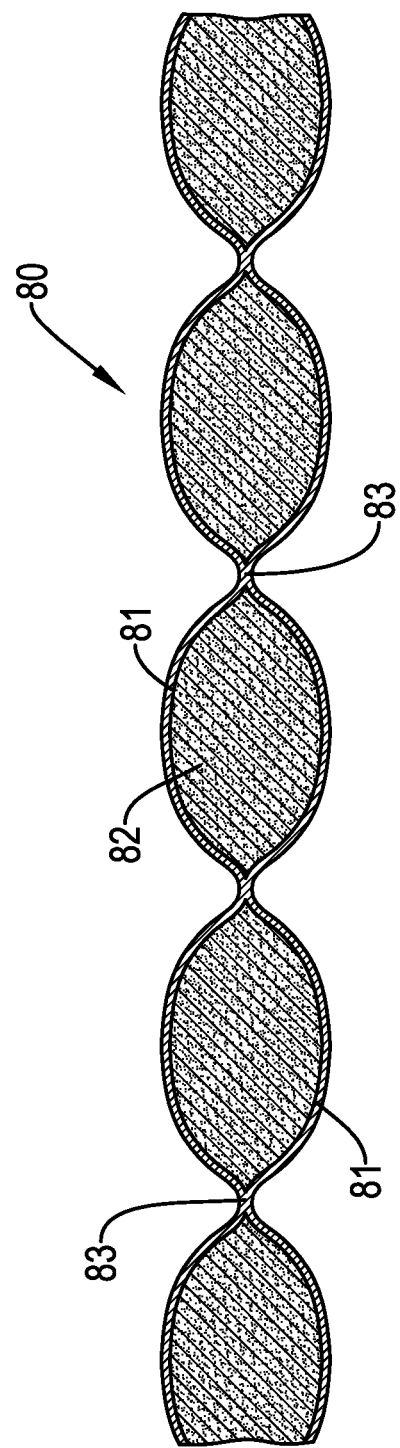
FIG. 8 is a cross sectional side view of a thermal insulation piece in accordance with the prior art.

With reference to FIGS. 4 to 6, the insulated fiberfill is placed between two fabrics 30, 40. The fabrics 30, 40 are respectively connected with the first fiber layer 10 and the second fiber layer 20. The margin of the insulated fiberfill is sewed with the margins of the fabrics 30, 40 to obtain a warm textile 50, 60, such as a coat (as shown in FIG. 5) or a sleeping bag (as shown in FIG. 6). As shown in FIGS. 4 to 6, the fabric 40 connected with the first fiber layer 10 is served as the inner surface of the warm textile 50, 60. The fabric 30 connected with the second fiber layer 20 is served as the outer surface of the warm textile 50, 60. In an embodiment, the fabric connected with the first fiber layer is served as the outer surface of the warm textile, and the fabric connected with the second fiber layer is served as the inner surface of the warm textile.

With reference to FIGS. 2, and 4 to 6, when the cold air at the outside of the warm textile 50, 60 blows through the fabric 30 connected with the second fiber layer 20, the cold air is blocked by the insulated fiberfill; especially, since the folding portions 22 are inclined toward the same direction, each of the folding portions 22 leans against an adjacent folding portion 22, and each of the folding portions 22 covers at least one of the joining portions 21, the cold air is blocked by the folding portions 22, and is thereby hard to permeate to the inside of the warm textile 50, 60 by passing through the joining portions 21 and the connecting portions 12. In addition, when the heat between the human body and the inside of the warm textile 50, 60 passes through the fabric 40 connected with the first fiber layer 10, the heat is blocked by the insulated fiberfill; especially, the heat passing through the connecting portions 12 and the joining portions 21 is blocked by the folding portions 22, and is thereby hard to dissipate outward from the inside of the warm textile 50, 60 by passing through the second fiber layer 20.

Therefore, by the folding portions 22 inclined toward the same direction and leaning against an adjacent folding portion 22 and each of the folding portions covering at least one of the joining portions 21, the insulated fiberfill effectively blocks the cold air and decreases heat dissipation, so the warm textile 50, 60 effectively keeps the human body warm.

Also, the insulated fiberfill is disposed between the fabrics 30, 40 that serve as the outer surface and the inner surface of the warm textile 50, 60, such as the coat or the sleeping bag. That is, the insulated fiberfill is applicable to the garment industry and the sleeping bag industry and is served as the inner layer of the coat and the sleeping bag directly. Hence, the processes for fabricating the coat and sleeping bag are simplified and the time for the same is shortened.

In addition, with reference to FIG. 4, as the heat which passes through the fabric 40 connected with the first fiber layer 10 is hard to be transmitted by the air in the air space 23 to the second fiber layer 20, the heat is hard to further dissipate outwardly by the fabric 30 connected with the second fiber layer 20. As a result, the heat is kept between the human body and the inside of the warm textile 50, 60, so the warm textile 50, 60 effectively keeps the human body warm.

Further, the second fiber layer 20 is fixed and connected with the first fiber layer 10 at the joining portions 21, and the staple fiber layer is fluffy, compressible, and flexible. When the second fiber layer 20 is a staple fiber layer, the folding portions 22 are bent and compressed between the fabric 30 and the first fiber layer 10 in the shape of the human body. As such, the insulated fiberfill is fit with the human body, and the gap between the insulated fiberfill and the human body is narrowed; thereby the heat of human body dissipated via the gap is decreased. Besides, the insulated fiberfill is easily compressed for storage.

What is claimed is:

1. An insulated fiberfill comprising:
a first fiber layer comprising:
an inner surface; and
multiple connecting portions arranged on the inner surface and spaced from each other; and
a second fiber layer mounted on the inner surface and comprising:
multiple joining portions respectively connected with the connecting portions;
multiple folding portions inclined toward a same direction, each of the folding portions formed between two adjacent joining portions, leaning against an adjacent folding portion, wherein each of the folding portions covers at least two of the joining portions; and multiple air spaces respectively defined by the inner surface and each of the folding portions.

2. The insulated fiberfill as claimed in claim 1, wherein each of the folding portions covers two of the joining portions.

3. The insulated fiberfill as claimed in claim 1, wherein a distance between two adjacent joining portions is larger than a distance between two adjacent connecting portions.

4. The insulated fiberfill as claimed in claim 1, wherein the first fiber layer is made of a synthetic fiber, a natural fiber, or a combination thereof.

5. The insulated fiberfill as claimed in claim 2, wherein the first fiber layer is made of a synthetic fiber, a natural fiber, or a combination thereof.

6. The insulated fiberfill as claimed in claim 3, wherein the first fiber layer is made of a synthetic fiber, a natural fiber, or a combination thereof.

7. The insulated fiberfill as claimed in claim 1, wherein the second fiber layer is a staple fiber layer.

8. The insulated fiberfill as claimed in claim 5, wherein the second fiber layer is a staple fiber layer.

9. The insulated fiberfill as claimed in claim 6, wherein the second fiber layer is a staple fiber layer.

10. The insulated fiberfill as claimed in claim 1, wherein the joining portions are respectively sewed with the connecting portions.

11. The insulated fiberfill as claimed in claim 8, wherein the joining portions are respectively sewed with the connecting portions.

12. The insulated fiberfill as claimed in claim 9, wherein the joining portions are respectively sewed with the connecting portions.

\* \* \* \* \*